United States Patent [19]

Lee et al.

[11] 4,355,116
[45] Oct. 19, 1982

[54] STABLE HIGH PERFORMANCE BIPOLAR MEMBRANE WITH CROSS-LINKED FUNCTIONAL GROUPS

[75] Inventors: Lester T. C. Lee, Taipei, Taiwan; Kang-Jen Liu, Bridgewater, N.J.

[73] Assignee: Allied Corporation, Morris Township, Morris County, N.J.

[21] Appl. No.: 220,568

[22] Filed: Dec. 29, 1980 (Under 37 CFR 1.47)

[51] Int. Cl.$^3$ .......................... C08F 8/32; C08H 5/22
[52] U.S. Cl. ........................................................ 521/27
[58] Field of Search ............................................ 521/27

[56] References Cited

U.S. PATENT DOCUMENTS 4,057,481  11/1977  Lee et al. ............................ 204/296
4,116,889   9/1978  Chlanda et al. ........................ 521/27

Primary Examiner—William F. Hamrock
Assistant Examiner—Peter F. Kulkosky
Attorney, Agent, or Firm—Thomas D. Hoffman; Arthur J. Plantamura

[57] ABSTRACT

Stable single film bipolar membranes of prolonged life and improved performance particularly for use in electrodialysis water splitting process, are prepared by introducing a more stable interface in the membrane structure. After the cationic exchange groups are preformed on an insoluble cross-linked aromatic polymeric matrix, the dissociable anionic exchange groups may be introduced more intimately chemically bonded in position by using multi-functional compounds containing mixed tertiary, secondary and primary amine groups, so that the resulting interface is comparatively more stable, and is less likely to be neutralized, therefore, attaining longer life-time and a higher level of performance.

18 Claims, 2 Drawing Figures

CROSS-SECTION OF A SINGLE FILM BIPOLAR MEMBRANE

LIFE STABILITY OF SINGLE FILM BI-POLAR MEMBRANE WITH MULTI-AMINE CROSS-LINKING (TESTED IN ED/SO$_2$ REGENERATING PROCESS)

STABLE HIGH PERFORMANCE BIPOLAR MEMBRANE WITH CROSS-LINKED FUNCTIONAL GROUPS

DESCRIPTION

BACKGROUND OF THE INVENTION

Bipolar membranes have been prepared for a variety of uses including, for example, for improving desalination processes, as analogs to certain biological membranes, and for the production of acid and base from salt. The latter process has great potential usefulness since it allows the production of commercially important acids and bases from neutral salts, e.g., NaCl may be converted to HCl and NaOH. The potential for carrying out this type of conversion by means of bipolar membranes, the process known as electrodialytic water splitting, has not yet been realized as an industrial process primarily due to insufficient membrane life, stability and electrical properties of bipolar membranes which should have the following properties:

(1) sufficient mechanical strength
(2) ability to operate at high current density
(3) high permselectivity
(4) low potential drop
(5) stable properties Additionally the bipolar membrane should be easily fabricated and have reproducible properties. Many preparations of bipolar membranes are reported in the literature. For example in U.S. Pat. No. 2,829,095, bipolar membranes are disclosed as being prepared by adhering two membranes consisting of oppositely charged ion exchange resins in an inert matrix bonded together either by fusion with heat and pressure or by use of a polyethyleneimine-epichlorohydrin paste. Anion and cation membranes have also been fused together as disclosed in U.S. Pat. No. 3,372,101 and British Pat. No. 1,038,777 by means of heat and pressure to give bipolar membranes. Additionally the application of an anionic polyelectrolyte paste to a cationic membrane which is then cured to yield a bipolar membrane has been described. Further, the preparation of bipolar membranes from a single sheet of material by selective functionalization of one side to cation or anion membrane followed by functionalization of the other side to the opposite type of membrane is disclosed for example in U.S. Pat. No. 3,654,125, and the formation of bipolar membranes in situ by passing a direct current through anion or cation membranes in contact with finely divided ion exchange resin slurries of charge opposite to that of the membrane is disclosed in published U.S. Patent Application No. 435,791, filed Jan. 23, 1974 (PB 230409) National Technical Information Service. In spite of such prior disclosures most membranes available up to the present time have been deficient in one or more of the properties desirable for bipolar membranes to be used for the process of electrodialytic water splitting on a practical level. It is thus seen that a need exists for a bipolar membrane of improved stability, high permselectivity and low potential drop.

In U.S. Pat. No. 4,116,889 (F. P. Chlanda, L. T. C. Lee and K. J. Liu) there is disclosed a method of preparing cast bipolar membranes by applying a second layer or coating of a cation exchange resin in a matrix polymer upon an anionic first layer preformed from a mixture of polyvinylidene fluoride, polyvinyl benzyl chloride solvent and multifunctional amine at least one of which is tertiary, mixed together in the proper proportions.

The subject matter of this application is also related to subject matter disclosed in U.S. Pat. No. 4,024,403 (G. J. Dege and K. J. Liu) entitled "Single Film, High Performance Bipolar Membrane" issued on May 17, 1977 and in U.S. Pat. No. 4,057,481 (L. T. C. Lee, G. J. Dege and K. J. Liu) issued on Nov. 8, 1977 entitled "High Performance, Quality Controlled Bipolar Membrane" and U.S. Pat. No. 4,083,768 (L. T. C. Lee and K. J. Liu) issued on Apr. 11, 1978, entitled "Preparation of High Performance Polyelectrolyte Membrane."

SUMMARY OF THE INVENTION

The primary object of the invention is to prepare a stable single film bipolar membrane which has a relatively long life and is prepared from a matrix of a polymeric film in which there is dispersed in intimate relationship a relatively high amount i.e. at least 15 percent by weight of an aromatic polymer thereby yielding a relatively highly crosslinked structure. The cationic exchange groups are chemically introduced onto the aromatic polymer of the matrix from one side of the matrix film, while the anionic exchange groups are subsequently chemically introduced to the aromatic groups from other side of the matrix film. In the structure prepared in this manner it is desirable that a bipolar membrane with a relatively clearly defined interface between the cationic and anionic layers be formed. This character of the interface is important to the performance and stability of the water-splitting functions. If the interface region has insufficient charge groups, the bipolar membrane will have high electrical resistance. If the interface region has sufficient charge groups, then these charge groups must be well fixed in their respective domains so that the capacity of the membrane does not deteriorate, i.e. so that the adjacent cationic and anionic exchange groups do not gradually migrate toward each other and slowly form a neutralized barrier which adversely affects the quality and efficiency of the membrane.

The present invention has for its purpose a novel method to make the charged groups less transient thereby preventing movement from their active positions and thus maintaining a more stable interface. The single film bipolar membrane produced according to the invention has low electrical resistance, high current efficiency and has been demonstrated to have a long term stability in the acid base water splitting electrodialysis process.

The single film bipolar membranes of the present invention are preferably prepared by first forming the cationic exchange layer onto the aromatic nuclei of the preformed matrix film which comprises a cross-linked polystyrene-divinylbenzene network. The functionalized cationic layer thus prepared comprises from about 50% to about 99% of the membrane thickness and has a clearcut interface boundary. The next step is to chemically introduce the anionic exchange groups onto the remaining aromatic nuclei in from about 1% to about 50% of the membrane thickness from the opposite side of the film. We have discovered that crosslinking of the functional groups at this point will greatly increase the stability of the resulting bipolar membranes. As the anionic exchange groups are introduced onto the matrix film and impregnate the film up to the cationic phase layer, a stepwise amination is used to enhance the degree of cross-linking and the chloromethyl groups on the aromatic nucleus is initially aminated with a multi-, i.e. di- or tri-functional amine or mixture thereof containing a mixed ratio of multifunctional primary, or secondary and tertiary amine groups and optionally a tertiary amine followed by treatment with a monofunctional amine. By carrying out the functionalization in this fashion, in which multi-functional groups are introduced with the mono-amine compound, we have discovered that the resultant single film bipolar membrane as shown by test is much more stable, has low electrical resistance, and has high performance over a long period of time. The single film bipolar membrane of the present invention was tested in the acid-base water-splitting operation for 260 days with only moderate increase in electrical resistance. (See FIG. 2)

DETAILED DESCRIPTION OF THE INVENTION

Figure 1:
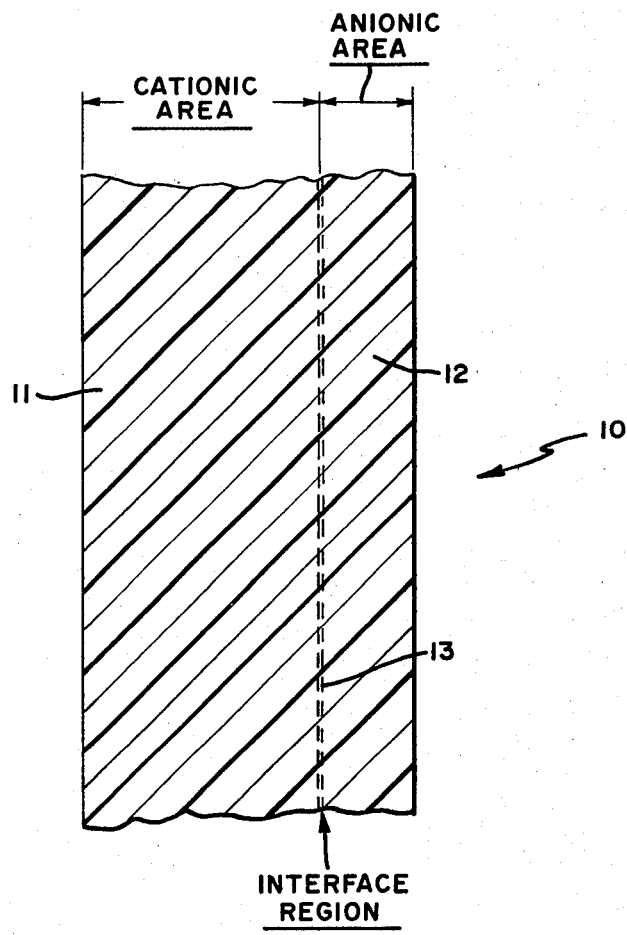
FIG. 1 illustrates schematically a typical cross-section bipolar membrane illustrating the interface between the two functional groups.

As shown in the representation in FIG. 1 of the drawing a typical cross-section of a single film bipolar membrane prepared in accordance with the invention is illustrated. As shown, the bipolar membrane 10 consists of three major portions, the cation selective layer 11, the anion selective layer 12, and the interface 13 between the cation and anion layers.

A requirement for producing bipolar membranes of low potential drop is that the cationic and anionic layers 11 and 12 come into intimate contact to prevent formation between them of a high resistance water layer. It is important, at the same time, that the cationic and anionic phases do not substantially interpenetrate or mix with one another in a manner which would result in a high resistance layer at the interfaces. A major obstacle in the past has been the attainment of an interface which has low resistance and long-term stability; this has hampered practical development of processes using bipolar membranes. The present invention is particularly concerned with production of single film bipolar membranes in which the interface layer is relatively stable. An advantage of the membrane of the present invention is that possibility of intermingling of the anion and cation portions of the membrane is largely eliminated without reducing the total number of functional groups. Further, the single film bipolar membrane prepared according to the invention has functional groups which are less mobile and thus, the probability of interaction between cationic and anionic exchange groups in the interface region is greatly lessened, thereby enhancing the stability of the interface layer, and imparting a relatively long and efficient life to the membrane.

The interface stability of the single film bipolar membrane of the present invention is based on a double cross-linked process in which in addition to the cross-linked base matrix film, further cross-linking to reinforce its stability is introduced via introduction of an anionic multi-functional amine groups. This can be illustrated in the following scheme which showed that the anionic exchange reagent e.g., a di-functional amine compound containing one tertiary amine group and one primary amine group is used to cross-link the benzyl chloride groups which are attached to the cross-linked styrene-divinylbenzene network.

As shown in above scheme, the cross-linking occurs when two or more benzyl chloride groups react with a single molecule of multifunctional amine. Cross-linking and quaternary ammonium groups are introduced at the same time by reaction of the multi-functional amine compound with the benzyl chloride group.

Thus, in accordance with the process of the present invention it was discovered that the anionic exchange reagent which effects amination and cross-linking comprises from about 5 to about 95 weight percent, preferably from about 50 to about 95 weight percent, more preferably from about 85 to about 95 weight percent of a multi-functional, i.e. di or trifunctional amine or mixture containing a mixed ratio of multi-functional primary, or secondary and tertiary amines and from about 95 to about 5 weight percent, preferably about 50 to about 5 weight percent, more preferably 15 to 5 weight percent of a monofunctional tertiary amine. This amination and cross-linking functionalization may conveniently be carried out in two stages; in the first stage amination and crosslinking is effected with the multi-functional amine described above and then a monofunctional amine, preferably a tertiary amine, more preferably trimethyl amine is applied in a second stage.

Among the multifunctional amines found useful in the present invention are those selected from the group consisting of compounds having the formula:

$R_1R_2N\text{-}T\text{-}NR_3R_4$, wherein $R_1$, $R_2$, $R_3$ and $R_4$ are independently selected from the group consisting of hydrogen and, straight and branched chain alkyl groups containing one to eight carbon atoms; and wherein T is selected from the group consisting of straight and branched chain alkylene groups containing two to eight carbons;

R$_5$R$_6$N-A-NR$_7$R$_8$, wherein R$_5$, R$_6$, R$_7$ and R$_8$ are independently selected from the group consisting of hydrogen and, straight and branched chain alkyl groups containing one to eight carbon atoms; and wherein A is cyclic alkylene of four to eight carbons, heterocyclic alkylene of five to eight carbons and one to three heteroatoms aryl or heteroaryl containing one to three heteroatoms wherein the hetereoatom is selected from the group consisting of nitrogen, oxygen and sulfur;

R$_9$R$_{10}$N(CH$_2$)$_n$N(R$_{11}$)-(CH$_2$)$_z$-X, wherein R$_9$, R$_{10}$ and R$_{11}$ are independently selected from the group consisting of hydrogen and, straight or branched chain alkyl groups containing one to eight carbons; wherein z and n are independently selected from an integer from one to six and wherein X is OH, NH$_2$, CN, CH$_3$NH or (CH$_3$)$_2$ N; and, R$_{12}$R$_{13}$N-(CH$_2$)$_p$-Q, wherein R$_{12}$ and R$_{13}$ are independently selected from the group consisting of hydrogen and straight or branched chain alkyl groups having one to eight carbons; p is an integer from 1 to 3; and Q is heterocyclic alkylene having four to eight carbons or heteroaryl containing one to three hetero atoms selected from the group consisting of nitrogen, oxygen and sulfur. Mixture of these substances can also be effectively employed.

Figure 2:
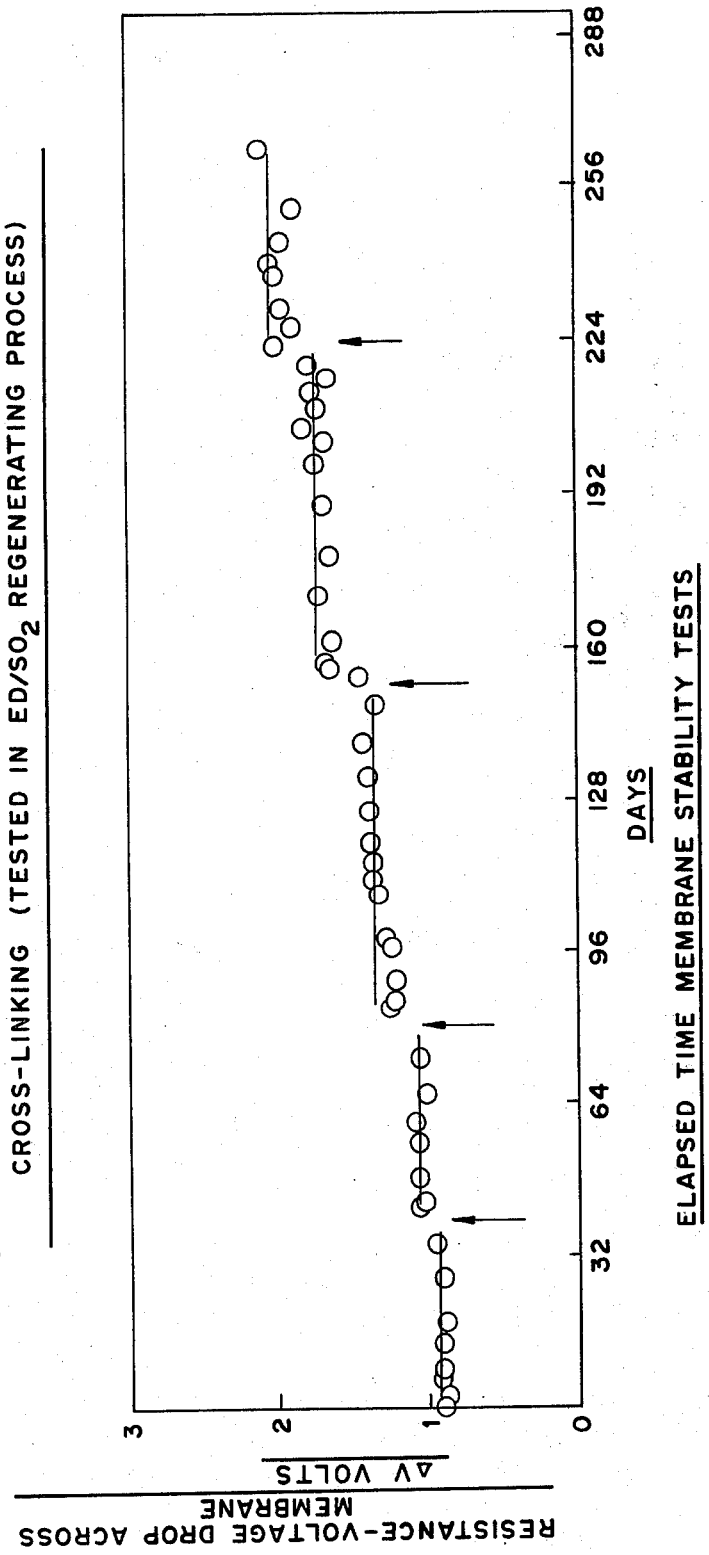
FIG. 2 is a diagram illustrating the stability performance of a single film bipolar membrane utilizing multi-amine crosslinking of the present invention.

The preferred multi-functional amines described above contained at least one tertiary amine moiety and at least one other moiety which was a primary, secondary or tertiary amine, preferably a primary amine. In one specific embodiment (Example 1) in the first stage of the amination and cross-linking, a mixture of 5 weight percent of a primary diamine (ethylenediamine) and 95 weight percent of a tertiary diamine (N,N,N',N'-tetramethyl-1,3-propanediamine) was employed, followed by a mono-tertiary amine, trimethylamine, in the second stage. The single film bipolar membrane so prepared was operated in a electrodialytic-SO$_2$ regeneration process for 260 days at 30° C.; only a moderate increase in electrical resistance was observed at the commercially feasible current density of 100 amp/ft$^2$ (108 ma/cm$^2$). The results of this test are summarized in Table I and are graphically displayed in FIG. 2.

Particularly preferred multi-functional amines were selected from the group consisting of ethylene-diamine, N,N,N',N' tetramethyl-1,3-propanediame, N,N-dimethyl-1,3-propanediamine, N,N,N',N'-tetramethyl-1,6-hexanediamine, N,N'dimethyl-1,6-hexanediamine, N,N-bis(3-aminopropyl)methylamine, ortho-, meta- and para-N,N,N',N'-tetramethylxylylenediamines, ortho, meta and para-N,N-dimethylxylylenediamine or mixtures thereof.

By the term hetero aryl used with A or Q above we mean substituted morpholines, pyridines, picolines, anilines and substituted pyrimidines having the formula:

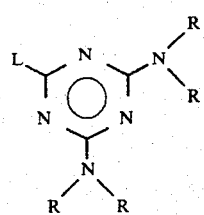

wherein R is independently selected from the group consisting of hydrogen and straight or branched chain alkyl groups containing one to eight carbons and wherein L is OH, CN, straight or branched chain alkyl group of one to eight carbons or dialkyl amino wherein alkyl is as described above.

Exemplary of the heterocyclic alkylenes found useful in the invention are piperdine 1,4-piperazine and 1,4-diazabicyclo[2.2.2]octane.

TABLE I

Comparison of the Performance of Single Film Bipolar Membrane Treated With and Without Multi-functional Amines

| Membrane(1) | AER(2) | Initial | | Voltage Drop(6) | | |
| --- | --- | --- | --- | --- | --- | --- |
| | | $E_o$ | $E_m$ | 30 Days | 60 Days | 260 Days |
| 1$^a$ | 5% EDA(3) 95% TMPDA(4) | 0.77 | 1.16 | 1.07 | 1.17 | 1.76 |
| 11$^b$ | TMA(5) | 0.77 | 1.15 | 1.59 | >2.0 | —(7) |
| 12$^c$ | TMA | 0.76 | 0.15 | 1.49 | >2.0 | —(7) |
| 13$^d$ | TMA | 0.70 | 1.16 | 1.45 | >2.0 | —(7) |

Notes to Table I
(1)The number of the membranes listed above refers to the number of the Example wherein its preparation is described. The film composition is given below.
$^a$Membrane of Example 1: 10 mil of UHMW-PE(matrix film) containing 43 wgt. % polystyrene (PS), 10 wgt % divinyl benzene (DVB); cationic layer comprised 91% of the thickness of the bipolar membrane.
$^b$Membrane of Example 11: 10 mil of UHMW-PE containing 42 wgt % PS, 10 wgt % DVB; cationic layer comprised 90% of the thickness of the bipolar membrane.
$^c$Membrane of Example 12: 10 mil of UHMW-PE containing 45 wgt % PS, 7.5 wgt % DVB; cationic layer comprised 86% of the thickness of the bipolar membrane.
$^d$Membrane of Example 13: 8 mil of UHMW-PE containing 40 wgt % PS, 10 wgt % DVB; cationic layer comprised 90% of the thickness of the bipolar membrane.
(2)AER-Anionic Exchange Reagent expressed as weight %.
(3)EDA-Ethylenediamine.
(4)TMPDA-N,N',N'tetramethyl-1,3-propanediamine.
(5)TMA-Trimethylamine.
(6)Voltage drop at a current density of 77-91 ma/cm$^2$ (71-84 amp/ft$^2$) at 30° in a water splitter containing 9% NaHSO$_3$ in H$_2$O.
(7)Voltage too high to measure.

In Table I the water-splitting performance of a single film bipolar membrane functionalized and cross-linked with a mixture of multi-functional amines and subsequently treated with a mono-functional amine i.e. trimethylamine (Example 1) in accordance with the present invention has been compared with single film bipolar membranes (Examples 11-13) wherein the anionic exchange groups have been introduced by treatment with monofunctional amines, i.e., trimethylamine. The prior art membranes (Examples 11-13) showed potential drops higher than 2 volts after only 60 days of operation in the electrodialytic/SO$_2$ regeneration cell. Surprisingly the membrane (Example 1) prepared in accordance with the present invention had a potential drop of 1.76 volts at 100 amp/ft$^2$ after 260 days. A potential drop of greater than 2 volts has been found unattractive for commercial operation.

Thus, it has been demonstrated experimentally that the functionalizing and cross-linking procedure of the present invention has enhanced the life-stability of the resultant bipolar membrane markedly. This can be explained by the fact that by localizing the mobility of the functionalized groups, the chance for the cationic and anionic exchange groups coming into intimate contact is substantially reduced. The formation of the high resistance neutral-layer is thereby eliminated or delayed, and consequently, the life stability of the bi-polar membrane is enhanced and prolonged.

The following examples illustrate the invention further, however, the specific recitation of details should not be interpreted as a limitation except as recited in the appended claims. Unless otherwise stated, parts are parts by weight.

EXAMPLE 1

The following procedures were employed to demonstrate the stepwise amination and cross-linking process in preparing the stable, long-life stability bipolar membranes of the invention. In preparing the membrane the thickness of initial polyethylene film was first examined with a micrometer to assure a substantially uniform thickness. The films were supported in stainless steel troughs containing mixtures of styrene monomer and 5–15% divinylbenzene (DVB); styrenations were carried out at 70°–94° C. for time periods of about 10 minutes to 1 hour. Following styrenation, the film is removed from the bath, excess styrene removed from the surface of the film, which is then pressed between aluminum foil covered glass plates and the styrene monomer polymerized and cross-linked at 70°–85° C. for 18–24 hours. In order to obtain styrene contents of about 40–60% the procedure may be repeated. After each polymerization, surface skin layer of polystyrene is removed with sanding, mechanical wiping or solvent cleaning to enhance unhampered introduction of functional groups.

In lieu of styrene various other vinyl aromatic compounds such as trimethyl styrene, dimethyl styrene and the like may be employed. Also in lieu of DVB other cross-linking agents or mechanisms such as radiation may be used.

Prior to introduction of cationic function groups by sulfonation, the cross-linked film is preferably preswollen in a solvent, inert to, but at least partially miscible with, the sulfonating agent or mixture for about 24 hours. Among the solvents found useful are carbon tetrachloride and 1,2-dichloroethane. Chlorosulfonations may be run at room temperature with chlorosulfonic acid-solvent mixtures containing from 10–100% volume, preferably at least about 53 volume % chlorosulfonic acid.

The reaction is started on one side of the film only and its progress through the film toward the opposite side is controlled and may be followed by microscopic examination of stained (methylene blue), microtoned cross-sections. The interface between the reacted and unreacted layers is linear, parallel to the sides of the film and even; this is attributed to both the homogeneity of the film and controlled diffusion of the reaction.

Once the partially chlorosulfonated film is hydrolyzed with dilute (1 N) sulfuric acid, neutralized with a 0.1 N KOH and 5% KCl mixture, rinsed free of excess electrolyte with distilled water, and dried, it is then ready for chloromethylation. In lieu of drying, the film may be treated with several portions of solvent such as carbon tetrachloride. The chloromethylation is conducted by immersing the films into chloromethylmethylether containing 2.5% by weight, SnCl4, and refluxing (59° C.) for about 6 hours under nitrogen. The film is then treated with 200 ml of a 20 weight % solution of a mixture 5 weight % ethylenediamine and 95 weight % N,N,N',N'-tetramethyl-1,3propanediamine in carbon tetrachloride for three days, then subsequently treated with 150 ml of a 25 weight % solution of trimethylamine in acetone for 2 days to complete the 2 stepwise amination cross-linking and, quaternization in 150 ml of a 25 weight % solution of trimethylamine in acetone at 25° C., for about 20 hours. The single film bipolar membrane so obtained is equilibrated in 1 N potassium fluoride at 25° C. for 48 hours, with stirring. Microtoned thin sections may be stained with either a cationic dye (methylene blue) and/or an anionic dye (methyl orange), and have been observed to compliment each other, with a sharp interface between them. Extensive chlorosulfonation and chloromethylation plus quaternization may be observed by both chemical analysis and microscopic examination and indicates the concentrations of both functional groups in the final membrane are nearly equal.

The performance of the bipolar membrane is determined in the following manner. Electrical sensitivity—the voltage drop across the bipolar membrane—is determined in a six-cell electrodialysis cell, containing platinum electrodes in each end compartment, across which a direct current may be applied from a D.C. power source (e.g. Hewlett-Packard Model No. 6289A). The bipolar membrane is mounted between the two center cells with its anion permeable side contacted with a 1 N KOH electrolyte solution and facing the anode and its cation permeable side contacted with 1 N HCl solution and facing the cathode. One normal KCl is used in the two adjacent cells, with 5% $K_2SO_4$ in the two end electrode compartments. Two Luggin tips (saturated KCl in agar-agar) are positioned in the center of the two middle cells, about 2 mm from the opposite faces of the bipolar membrane. The other ends of the Luggin tips are immersed in saturated KCl solutions containing two Calomel electrodes which are connected to a voltmeter. The voltage drop across the 1 N HCl and 1 N KOH solutions between the Luggin tips was determined in separate measurements, averaged, and subtracted from the voltage drop measured with the bipolar membrane in position. The voltage drop across the bipolar membrane was then measured at various current densities, e.g. 1.8–165 ma/cm$^2$ (1.7–154 amp/ft$^2$) and the results are shown in Table II. Since about 0.75 volts are required to split water, voltages in excess of this value are due to the resistance of the bipolar membrane itself. In addition, at no current flow the voltage drop, Eo, across the bipolar membrane is generally about 0.75–0.80 volts.

The final single film bipolar membrane had a potential drop across it of 1.07 at 109 ma/cm$^2$ (DC) when measured in an electrodialysis cell with 1 N KOH and 1 N HCl next to its anionic and cationic permeable sides, respectively. Its potential drop at zero current flow (Eo) was 0.81 volts, indicative of the fact that the membrane is bipolar and effectively functions in a water splitting reaction. When the bipolar membrane was placed in an electrodialysis cell with 10% acid and 10% base on opposite sides of the membrane at 163 ma/cm$^2$ (DC), it has a base current efficiency of 74% and an acid current efficiency of 83% and in the acid at only 0.5%. This membrane was run continuously for 260 days in a water-splitting operation at 77–91 ma/cm$^2$ (DC) at 30° C. of NaHSO$_3$ solution (9%) with no loss in its performance characteristics and only a modest increase in its potential drop. The results have been summarized in Table I. This performance is further illustrated in FIG. 2 of the drawing.

EXAMPLE 2

The same procedure of Example 1 is essentially repeated except for the amination step where the film was first treated with 200 ml of a 10% N,N-dimethyl-1,3-propanediamine in 1,2-dichloroethane for 2 days, then treated with 150 ml of a 25% solution of trimethylamine in acetone for 24 hours, the performance of the membrane is shown in Table II.

EXAMPLE 3

The procedure of Example 1 is essentially repeated except for the amination step where the film was treated with 200 ml of a CCl$_4$ solution, 50 weight percent in amine (50% N,N-dimethyl-1,3-propanediamine and 50% trimethylamine) for 3 days. The performance of the membrane is shown in Table II.

EXAMPLE 4

The procedure of Example 1 is essentially repeated except for the amination step where the film was treated with 200 ml of a 20% solution of a mixture of 50% N,N,N',N'-tetramethyl-1,6-hexanediamine and 50% N,N bis(aminopropyl)methylamine at 40° C. in 1,2-dichloroethane for 76 hours. The performance of the membrane is shown in Table II.

EXAMPLE 5

The procedure of Example 1 is essentially repeated except for the amination step where the film is first treated with 200 ml of 20% N,N,N',N'-tetramethyl-p-xylylenediamine, in 1,2-dichloroethane at 55° C. for 42 hours, then treated with 150 ml of a 50% solution of a mixture of 50% trimethylamine (TMA) and 50% N,N,N',N'-tetramethylpropanediamine (TMPDA) mixtures for 48 hours. The performance of the membrane is shown in Table II.

EXAMPLE 6

The procedure of Example 1 is essentially repeated except the amination step where the film is first treated with 200 ml of 10% N,N,N',N'-tetramethyl-p-xylylenediamine in chloroform for 72 hours, then treated with 150 ml of a 25% solution of trimethylamine in acetone for one day. The performance of the membrane is shown in Table II.

EXAMPLE 7

The procedure of Example 1 is essentially repeated except for the amination step where the film is treated with 200 ml of a 20% solution of a mixture of 5% N,N,N',N'-tetramethyl-p-xylylenediamine and 95% trimethylamine in dioxane at 40° C. for 3 days. The performance of the membrane is shown in Table II.

TABLE II

The Preparation & Potential Drops For High Performance Single Film Bipolar Membranes

| Example No. | matrix film | Film Composition % polystyrene | % divinyl benzene | Chloro-Sulfonation (min.) | % Cationic Layer |
|---|---|---|---|---|---|
| 1 | 10 mil UHMW-PE | 43.21 | 10.0 | 320 | 91 |
| 2 | 10.5 mil UHMW-PE | 43.0 | 10.0 | 310 | 86 |
| 3 | 10 mil UHMW-PE | 46.0 | 7.5 | 285 | 90 |
| 4 | 10 mil UHMW-PE | 36.2 | 7.5 | 295 | 88 |
| 5 | 10 mil UHMW-PE | 39.0 | 7.5 | 290 | 85 |
| 6 | 11 mil UHMW-PE | 38.0 | 7.5 | 290 | 94 |
| 7 | 10 mil UHMW-PE | 38.9 | 7.5 | 290 | 95 |

| Example No. | Amination Exchange[1] Reagent | Voltage Drop (at 100 amp/ft$^2$) $E_o$ | $E_m$ |
|---|---|---|---|
| 1 | 1 5% Ethylenediamine 95%-TMPDA[2] 2 TMA[3] | 0.77 | 1.16 |
| 2 | 1 DMPDA[4] 2 TMA | 0.77 | 1.33 |
| 3 | 50% TMPDA 50% TMA | 0.78 | 1.28 |
| 4 | 1 50% TMHDA[5]-50% BAMA[6] 2 TMA | 0.70 | 1.15 |
| 5 | 1 TMXDA[7] 2 50% TMA-50% TMPDA | 0.77 | 1.24 |
| 6 | 1 TXMDA 2 TMA | 0.77 | 1.34 |
| 7 | 5% TMXDA 95% TMA | 0.79 | 1.24 |

[1]The amination step may require two steps to complete. The membrane is treated in 1st stage with a multiamine containing compound; and in the 2nd stage with a mono-amine compound i.e. trimethylamine is used.
[2]TMPDA - N,N,N',N'-tetramethyl-1,3-propanediamine.
[3]TMA Trimethylamine.
[4]DMPDA - N,N-dimethyl-1,3-propanediamine.
[5]TMHDA - N,N,N',N'-tetramethyl-1,6-hexanediamine.
[6]BAMA - N,N-Bis(3-aminopropyl)methylamine.
[7]TMXDA - N,N,N',N'-tetramethyl-p-xylylenediamine.

EXAMPLES 8–10

The procedure of Example 1 was essentially repeated except that in lieu of a polyethylene base film the following films were utilized using a chlorosulfonation time of 5 hours with comparable results. These examples are summarized in Table III.

TABLE III

| Example No. | Film Composition with 40% Styrene 8% DVB | Amination Agent |
|---|---|---|
| 8 | polypropylene | TMPDA[1] |
| 9 | polyethylene-polypropylene copolymer | DMPDA[2] |
| 10 | polytrifluorochloroethylene | TMA[3] |

[1]N,N,N',N'-tetramethyl-1,3-propanediamine
[2]N,N-dimethyl-1,3-propanediamine
[3]Trimethylamine

EXAMPLES 11–13

The procedure of Example 1 is essentially repeated except for the amination step wherein the film was treated with a 25% solution of trimethylamine in acetone for 20 hours. The results are summarized in Table I.

It will be apparent that various modifications are possible within the spirit of the invention and therefore it is understood that the invention shall not be limited except insofar as it becomes necessary by the limitations recited in the appended claims taken in the light of the prior art.

What we claim is:

1. In a process for manufacturing a high performance, durable single film bipolar membrane having a potential drop of 1.76 volts at 100 amp/ft$^2$ after 260 days wherein an olefinic polymeric film matrix is uniformly impregnated with a mixture of a vinylaromatic monomer and a cross-linking agent and said mixture is subsequently polymerized to obtain on the film intermittently dispersed therein at least 15 percent by weight of the vinylaromatic mixture based on the total weight of the membrane and said mixture is cross-linked and thereafter cationic and anionic functional groups are introduced in sequence thereon from opposite sides and wherein after chemically bonding from about 50% to about 99% of the membrane thickness with highly dissociable cationic exchange groups to the aromatic nuclei from one side only, highly dissociable anionic exchange groups are chemically bonded from the other side to the remaining aromatic nuclei in from about 1% to about 50% of the membrane thickness, the improvement which comprises using an anionic exchange reagent comprising from about 5 to about 95 weight percent of a cross-linkable multifunctional amine functionalizing agent and from about 95 to about 5 weight percent of a monofunctional tertiary amine.

2. The process of claim 1 wherein the olefin film is polyethylene.

3. The process of claim 1 wherein the olefin film is polypropylene.

4. The process of claim 1 wherein the olefin film is a polyethylene-polypropylene copolymer.

5. The process of claim 1 wherein the olefin film is polytrifluorochloroethylene.

6. The process of claim 1 wherein the concentration of the aromatic nuclei containing polymer comprises from about 20% to about 70% based on the total weight of the membrane.

7. The process of claim 1 wherein the anionic exchange reagent comprises from about 50 to about 95 weight percent of the cross-linkable multifunctional amine.

8. The process of claim 1 wherein the anionic exchange agent comprises from about 85 to about 95 weight percent of the cross-linkable multi-functional amine.

9. The process of claim 1 wherein the cross-linkable multi-functional amine functionalizing agent is selected from the group consisting of compounds having the formulas:

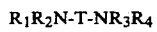

$R_1, R_2, R_3$ and $R_4$ are independently selected from the group consisting of hydrogen and straight and branched chain alkyl groups containing one to eight carbons; and T is selected from the group consisting of straight or branched chain alkylene goups containing two to eight carbons;

wherein $R_5, R_6, R_7$ and $R_8$ are independently selected from the group consisting of hydrogen and straight or branched chain alkyl groups containing one to eight carbon atoms; and A is cyclic alkylene of four to eight carbon atoms, heterocyclic alkylene of four to eight carbon atoms and one to three heteroatoms, aryl or heteroaryl containing one to three heteroatoms wherein the heteroatom is nitrogen, oxygen or sulfur $R_9R_{10}N(-CH_2)_n-N(R_{11})-(CH_2)Z-X$ wherein:
$R_9$, $R_{10}$, and $R_{11}$ are independently selected from the group consisting of hydrogen and straight or branched-chain alkyl groups containing from one to eight carbons;

z and n are independently selected from the group of integers of from one to six;

X is OH, $NH_2$, CN, $(CH_3)HN$ or $(CH_3)_2N$; and, $R_{12}R_{13}N-(CH_2)_p-Q$; wherein:

$R_{12}$ and $R_{13}$ are independently selected from the group consisting of hydrogen and straight or branched-chain alkyl groups having from one to eight carbon atoms;

p is 1, 2 or 3; and,

Q is heterocyclic alkylene having four to eight carbons or, heteroaryl wherein the heteroatom is nitrogen, oxygen or sulfur.

10. The process of claim 9 wherein the multifunctional amine comprises at least one tertiary amine moiety.

11. The process of claim 10 wherein the multifunctional amine further comprises one primary amine moiety.

12. The process of claim 1 wherein the multifunctional amine is selected from the group consisting of ethylenediamine, N,N,N',N'-tetramethyl-1,3-propanediamine, N,N'dimethyl-1,3-propanediamine, N,N,N',N'-tetramethyl-1,6-hexanediamine, N,N-bis(3-aminopropyl)methylamine, ortho-, meta- and para-N,N,N',N'-tetramethylxylenediamines and mixtures thereof.

13. The process of claim 1 wherein the monofunctional tertiary amine is trimethylamine.

14. The product produced by the method of claim 1.

15. The process of claim 1 wherein the cross-linkable multifunctional amine functionalizing agent comprises mixtures of multifunctional primary, secondary and tertiary amines.

16. The process of claim 15 wherein the improvement further comprises introducing said anionic exchange groups in two stages wherein in the first stage, said membrane is treated with said cross-linkable multifunctional amine agent and wherein in the second stage said membrane is amine agent and wherein in the second stage said membrane is treated with said monofunctional tertiary amine.

17. The process of claim 12 or 15 wherein the multifunctional amine is a mixture of N,N,N,N-tetramethyl-1,3-propanediamine and ethylenediamine.

18. The process of claim 12 or 15 wherein the multifunctional amine is a mixture of N,N,N,N-tetramethyl-1,6-hexanediamine and N,N-bis(3-amino propyl)methyl amine.

* * * * *